United States Patent [19]

Nomura et al.

[11] Patent Number: 4,862,343
[45] Date of Patent: Aug. 29, 1989

[54] INDUCTION MOTOR CONTROL APPARATUS

[75] Inventors: Masakatsu Nomura; Keiko Suda, both of Kanagawa; Tadashi Ashikaga, Tokyo, all of Japan

[73] Assignee: Kabushiki Kaisha Meidensha, Tokyo, Japan

[21] Appl. No.: 157,041

[22] Filed: Feb. 16, 1988

[30] Foreign Application Priority Data

Feb. 17, 1987 [JP] Japan ................................ 62-34049

[51] Int. Cl.$^4$ ............................................. H02M 1/12
[52] U.S. Cl. ....................................... 363/41; 363/37; 318/802; 318/811; 364/161
[58] Field of Search ........................ 363/35, 37, 41, 51, 363/85-89, 97-98; 318/798, 799, 800, 801, 802, 806, 811; 364/161

[56] References Cited

U.S. PATENT DOCUMENTS

| | | | |
|---|---|---|---|
| 4,377,779 | 3/1983 | Plunkett | 363/41 |
| 4,516,065 | 5/1985 | Ninomiya et al. | 318/811 |
| 4,602,201 | 7/1986 | Edwards | 318/811 |
| 4,615,000 | 9/1986 | Fujii et al. | 363/41 |
| 4,628,475 | 12/1986 | Azusawa et al. | 318/811 |

FOREIGN PATENT DOCUMENTS 0071847 of 1982 European Pat. Off. .
0121792 of 1984 European Pat. Off. .
0157202 of 1985 European Pat. Off. .

Primary Examiner—Peter S. Wong
Attorney, Agent, or Firm—Bachman & La Pointe

[57] ABSTRACT

An induction motor vector control apparatus calculates a slip factor using a secondary time constant. A reference signal is added as noise to the excitation current command signal. The secondary time constant is brought closer to its actual value by modifying the secondary time constant in a direction zeroing the correlation between the motor speed feedback signal and the reference signal.

11 Claims, 3 Drawing Sheets

INDUCTION MOTOR CONTROL APPARATUS

BACKGROUND OF THE INVENTION

This invention relates to an apparatus for controlling an adjustable speed electric motor and, more particularly, to an apparatus for vector control of an induction motor.

Electric power converters or inverters have been employed for the application of adjustable speed drives using alternating current motors. A typical converter includes a direct current (DC) rectifier for rectifying three-phase AC input voltage and for supplying the resulting direct current (DC) bus potential to an inverter. The inverter comprises a plurality of pairs of series-connected switching elements to generate an adjustable frequency output. In many applications, such a frequency adjustment is effected through a control circuit which employs a pulse width modulation (PWM) control technique in producing variable frequency gating pulses to periodically switch the respective switching elements so as to operate the motor at a variable speed. The motor can be propelled (motoring mode) or retarded (braking mode) as desired by appropriately varying the frequency and the amplitude of the excitation that the inverter applies to the motor.

The actual motor speed is sensed and compared with a commanded motor speed. An speed error signal, which depends on the difference between the actual and desired values of motor speed, is derived and applied to a proportional-plus-integral control circuit which converts it into a torque command signal. The control circuit responds to the torque command signal by controlling the operation of the inverter so as to vary, as a function of the torque command signal, the amplitude of the voltages supplied from the inverter to the motor.

In order to provide more accurate motor control, vector control has been proposed and employed to control the momentary value of the stator current of the induction motor to generate a torque. Slip frequency type vectro control employs an induction motor secondary resistance (secondary time constant) in calculating a slip frequency as:

$$\omega_s = (1/\tau_2^*) \times (i_{1\beta}^*/i_{1\alpha}^*)$$

where $\tau_2$ is the secondary time constant, $i_{1\alpha}$ is the excitation current, $i_{1\beta}^*$ is the torque current. This equation is obtained when a coordinate system is used which coincides with the power phase of the power source. The factors used in calculations are suffixed by the symbol *.

In steady conditions, the $\alpha$ and $\beta$ components $\lambda_{2\alpha}$ and $\lambda_{2\beta}$ of the secondary flux are represented as:

$$\lambda_{2\alpha} = M \times i_{1\alpha}^* \times (1 + KI^2)/\{1 + (KI)^2\}$$

$$\lambda_{2\beta} = M \times i_{1\beta}^* \times (1 - K)/\{1 + (KI)^2\}$$

where M is the mutual inductance of the induction motor, K is the ratio of $\tau_2/\tau_2^*$, and I is the ratio of $i_{1\beta}^*/i_{1\alpha}^*$.

As can be seen from the equations, the $\beta$ component of the secondary flux is not zero, resulting in improper vector control when the secondary time constant $\tau_2^*$ used in calculating the slip frequency is different from the actual secondary time constant $\tau_2$ (or K≠1). When the secondary flux contains a $\beta$ component, the torque Te of the induction motor is represented as:

$$Te = K_T \times (\lambda_{2\alpha} \times i_{1\beta} - \lambda_{2\beta} \times i_1)$$

where $K_T$ is a constant represented as $K_T = P \times M^2/L_2$, P is the pole number, and $L_2$ is the secondary inductance.

The secondary resistance (secondary time constant) varies by a factor of 1.5 from its initially set value due to ambient temperature changes, load changes, and induction motor secondary conductor temperature changes. The influence of the deviation of the secondary time constant from its actual value is serious particularly for inverters of current control type.

SUMMARY OF THE INVENTION

It is a main object of the invention to provide a simple induction motor vector-control apparatus which can realize idela induction motor vector control insensitive to ambient temperature change and induction motor load changes.

There is provided, in accordance with the invention, an apparatus for vector control of an adjustable-speed induction motor, including a motor drive circuit for applying power to drive the motor, and a control circuit responsive to a torque command signal, an excitation current command signal and a slip frequency for controlling the operation of the motor drive circuit so as to vary the power to the motor. The control circuit comprises a speed sensor sensitive to motor rotation speed for producing a speed feedback signal indicative of a sensed speed of rotation of the motor, a source for producing a speed command signal indicative of a desired motor speed, a source for producing an excitation current command signal indicative of a desired motor excitation current, a source for producing a reference signal, means for summing the speed feedback and command signals to provide a speed error signal indicative of the difference between the sensed and desired motor speeds, means for converting the speed error signal into the torque command signal, means for adding the reference signal to the excitation current command signal applied to the control circuit, means responsive to the excitation current command and the torque command signals for calculating the slip frequency using a secondary time constant, means for calculating a correlation coefficient indicative of a mutual relation between the speed feedback signal and the reference signal, and means for modifiying the secondary time constant in accordance with the correlation coefficient in a direction zeroing the correlation coefficient.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals idensify like elements in the several figures and in which:

DETAILED DESCRIPTION OF THE INVENTION

Figure 1:
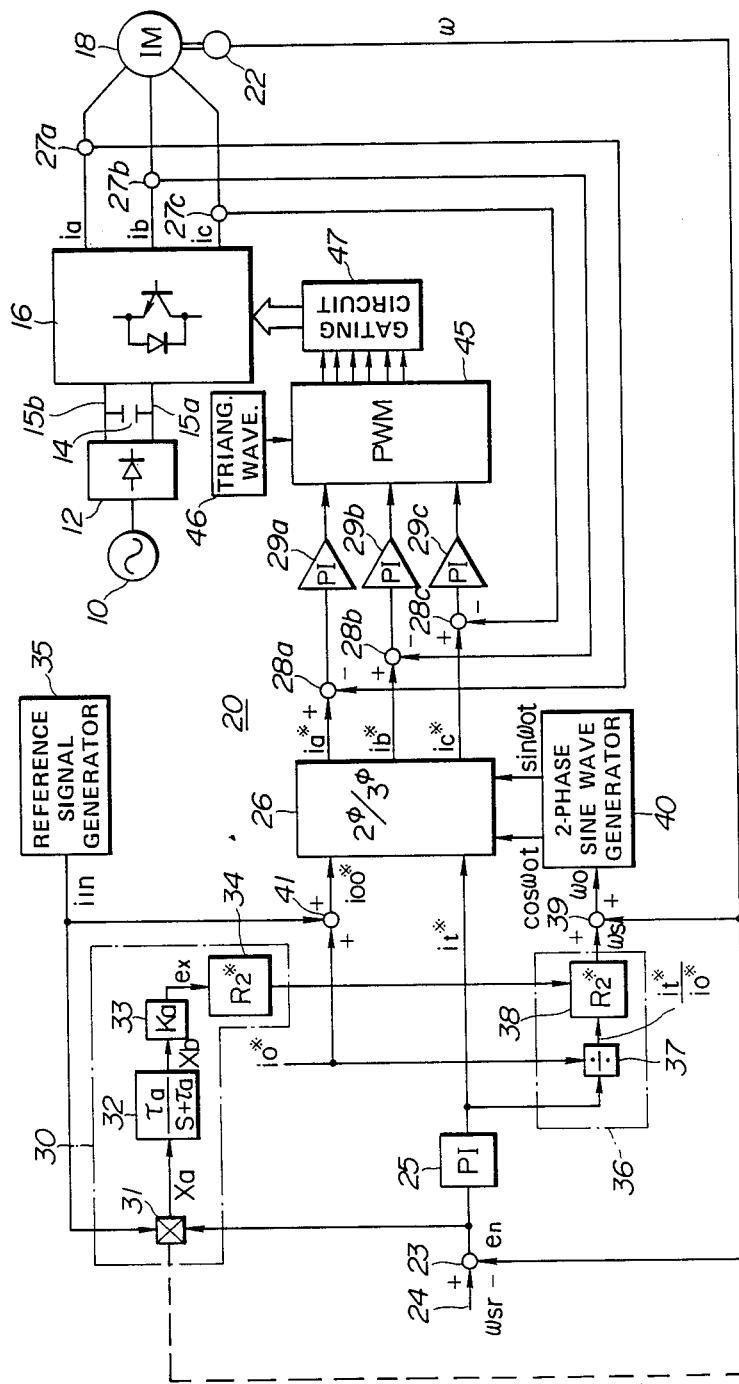
FIG. 1 is a schematic block diagram showing one embodiment of a induction motor vector control apparatus made in accordance with the invention.

With reference now to the drawings, wherein like numerals refer to like parts in the several views, and particularly to FIG. 1, an adjustable speed motor drive is shown as comprising a converter system 12 which receives electric power from a suitable AC power source 10. The converter system 12 includes a power rectifier which is operative to convert alternating voltage to unipolarity voltage for energizing a DC link shown as the relatively positive conductor 15a and the relative negative conductor 15b. The DC link is spanned by a capacitor 14 which smoothes the rectified power. The unipolarity voltage across the smoothing capacitor 14 is applied to a power inverter 16. The inverter 16 includes a plurality of parallel pairs of series-connected switching elements arranged and controlled to convert the DC input power into AC output power having adjustable frequency and voltage magnitude. For this purpose, each of the switching elements has its controlled electrode coupled to a control circuit 20 which will supply the switching elements with cyclic gate pulses to turn on the switching elements in a predetermined sequence and at a desired frequency. The AC output is supplied to a three-phase induction motor 18 through three output conductors. The induction motor 18 has three-phase stator windings which are energized by the output of the inverter 16 and a rotor coupled to drive a mechanical load (not shown).

The induction motor 18 can be propelled (motoring mode) or retarded (braking mode) as desired by appropriately varying the frequency and the amplitude of the excitation that the inverter 16 applies to the induction motor 18. For this purpose, the control circuit 20 regulates and controls the operation of the inverter 16 in programmed response to a plurality of input signals which may comprise a speed command signal $\omega_{sr}$ representative of the desired motor speed, a feedback signal $\omega$ representative of the actual motor rotational speed, and an excitation current command signal $i_o^*$. The control circuit 20 utilizes a pulse width modulation (PWM) control technique to produce gating pulses so as to periodically switch the respective power transistors of the inverter 16 in accordance with a speed pattern (speed command signal) programmed into the control circuit 20. The inverter 16 produces 3-phase currents ia, ib and ic through the respective output conductors to operate the induction motor 18.

An induction motor speed sensor 22, such for example as a resolver, produces an actual speed signal $\omega$ corresponding to the speed of rotation of the induction motor 18. The actual speed signal $\omega$ is applied from the speed sensor 22 to a subtractor 23 having another input $\omega_{sr}$ on a line 24. The subtractor 23 subtracts the actual speed signal $\omega$ from the speed command signal $\omega_{sr}$ on the line 24 and produces a speed error signal $e_n$ indicative of the difference between the actual and target speeds of rotation of the induction motor 18. The speed error signal $e_n$ is applied to a proportional-plus-integral amplifier 25 which converts it into a torque current command signal $i_t^*$. This torque current command signal $i_t^*$ is applied to a 2-phase/3-phase converter 26.

The speed error signal $e_n$ is also applied to a secondary time constant compensating coefficient generator section 30. The secondary time constant compensating coefficient generator section 30 includes a multiplier 31, a primary delay circuit such as a low pass filter 32, an amplifier 33, and a secondary time constant compensating coefficient generator 34. The multiplier 31 has an input coupled to the subtractor 23 and another input coupled to a reference signal generator circuit 35 which produces a sine wave reference signal $i_{1n}$. The multiplier 31 multiplies the speed error signal $e_n$ by the reference signal $i_{1n}$ and produces a multiplied signal Xa. The multiplied signal Xa is applied to the low pass filter 32 which extracts a DC component from the multiplied signal Xa. A signal Xb is applied from the low pass filter 32 to an amplifier 33 which multiplies the input signal Xb by a multiplier factor K and produces a correlation coefficient indication signal $e_x$ indicative of a coefficient having a mutual relation between the speed error signal $e_n$ and the reference signal $i_{1n}$. The correlation coefficient indication signal $e_x$ is applied to the secondary time constant compensating coefficient generator circuit 34. The secondary time constant compensating section 30 calculates a secondary time constant $\tau_2^*$ and produces a signal indicative of the reciprocal ($R_2^* = 1/\tau_2^*$) of the secondary time constant $\tau_2^*$. This signal is applied to a slip calculation circuit 36.

The slip calculation circuit 36 includes a divider 37 and a multiplier 38. The divider 37 has an input coupled to the proportional-plus-integral circuit 25 and another input coupled to an excitation current calculation circuit (not shown) which produces an excitation current command signal $i_o^*$. The divider 37 divides the torque command current signal $i_t^*$ by the excitation current command signal $i_o^*$ and produces a signal $i_t^*/i_o^*$. This signal is applied to the multiplier 38 on which the secondary time constant compensating coefficient $R_2^*$ is loaded from the secondary time constant compensating coefficient generator 34. The multiplier 38 multiplies the signal $i_t^*/i_o^*$ by the secondary time constant compensating coefficient $R_2^*$ ($=1/\tau_2^*$) and produces a slip frequency indication signal. The slip frequency indication signal is applied to a summing circuit 39 which addes it to the actual speed signal $\omega$ fed thereto from the induction motor speed sensor 22. The added signal $\omega_o$, which indicates an angular frequency $\omega_o$, is applied to a 2-phase sine wave generator 40 which thereby generate 2-phase sine waves $\sin \omega_o t$ and $\cos \omega_o t$ to the 2-phase/3-phase converter 26.

The excitation current command signal $i_o^*$ is also applied to a summing circuit 41 which recieves another input from the signal generator circuit 35. The summing circuit 41 addes the excitation current command signal $i_o^*$ to the reference signal $i_{1n}$ and produces an added signal $i_{oo}^*$. This signal is applied to the two-phase/three-phase converter 26.

The 2-phase/3-phase converter 26 converts the two-phase sine wave signals $\sin \omega_o t$ and $\cos \omega_o t$ into three-phase current command signals ia, ib and ic in accordance with the torque command signal $i_t^*$ and the added signal $i_{oo}^*$. The current command signal $i_a^*$ is applied to a subtractor 28a which recieves another input from a current sensor 27a. The subtractor 28a subtracts the actual drive current $i_a$ from the current command signal $i_a^*$ to produce a current error signal which is applied to a proportional-plus-integral circuit 29a and hence to a pulse width modulation (PWM) waveform generator 45. The current command signal $i_b^*$ is applied to a subtractor 28b which receives another input from a current sensor 27b. The subtractor 28b subtracts the actual drive current $i_b$ from the current command signal $i_b^*$ to produce a current error signal which is applied through a proportional-plus-integral circuit 29b to the PWM waveform generator 45. Similarly, the current command signal $i_c^*$ is applied to a subtractor 28c which receives another input from a current sensor 27c. The subtractor 28c subtracts the actual drive current $i_c$ from the current command signal $i_c^*$ to produce a current error signal which is applied through a proportional-plus-integral circuit 29c to the PWM waveform generator 45.

The PWM waveform generator 45 reiceives a triangle wave signal from a triangle wave generator 46 and controls a gating circuit 47 to produce gating pulses so as to periodically switch the respective power transistors of the inverter 16.

Figure 2:
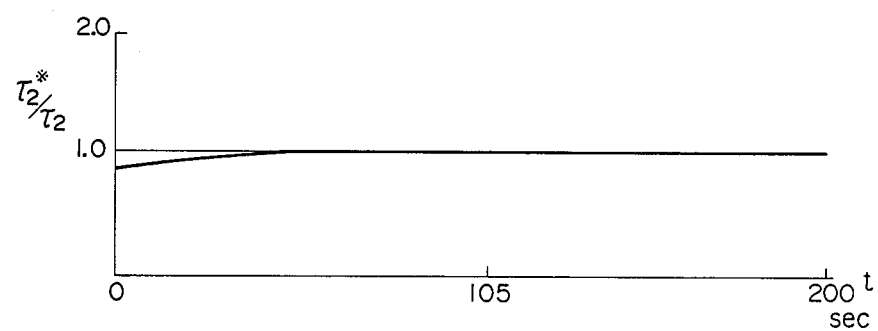
FIGS. 2A and 2B are graphs used in explaining the operation of the induction motor vector control apparatus of FIG. 1.
Figure 2:

The operation is as follows: When the sine wave reference signal $i_{1n}$ is applied from the reference signal generator circuit 35 to the summing circuit 41 where it is combined as noise with the excitation current command signal $i_o^*$, the secondary time constant $\tau_2^*$ used in calculating a slip frequency will deviate from the actual value $\tau_2$, as shown in FIG. 2A, and the secondary flux will contain a $\beta$ component $\lambda_{2\beta}$, as shown in FIG. 2B. The $\beta$ component included in the secondary flux have an effect on the torque Te of the induction motor 18 to vary the speed $\omega$ of rotation of the induction motor 18 with the reference signal $i_{1n}$. The reference signal $i_{1n}$ is selected to have a small amplitude, such for example as, an amplitude equivalent to about 10 percents of that of the excitation current command signal $i_o^*$.

The reference signal $i_{1n}$ is also applied to the multiplier 31 where it is multipled by the speed error signal $e_n$. The multiplier 31 produces an output Xa represented as $Xa = e_n \times i_{in}$. The output signal Xa is applied to the low pass filter 32 which extracts a DC component therefrom. The DC component Xb corresonds to the deviation of the secondary time constant $\tau_2^*$ from the actual value $\tau_2$ and it is represented as:

$$Xb = KaXa + KbXb$$

where Ka and Kb are constants dependent on the time constant of the low pass filter 32.

The output signal Xb is applied to the amplifier 33 which produces a correlation coefficient indication signal $e_x$ having a mutual relation between the speed signal $\omega$ and the reference signal $i_{1n}$. If the correlation coefficient indication signal $e_x$ is zero, no $\beta$ component is contained in the second flux. Therefore, it is apparent that the correlation coefficient $e_x$ indicates whether or not the $\beta$ component is contained in the secondary flux. Although the speed error signal $e_n$ is applied to the multiplier 31, it is to be noted that there is no intention to be limited to such a signal. The actual speed signal w or the like including a component related to the actual speed signal may be applied to the multiplier 31 instead of the speed error signal $e_n$. The correlation coefficient indication signal $e_x$ is given as:

$$e_x = {_0\int^t} \omega \times i_{in} dt$$

$$e_x = (-K_T/J) \times (\tfrac{1}{2}) \times ({_0\int^t} i_{in} dt)^2 \times \lambda_{2\beta}$$

where $K_T$ is a constant and J is the moment of inertia.

The correlation coefficient indication signal $e_x$ is applied to the secondary time constant compensating coefficient generator circuit 34 which may include means for integrating the correlation coefficient $e_x$ with a sign being determined by the sign of the reference signal $i_{1n}$. In other words, the secondary time constant compensating coefficient $R_2^*$ varies in a direction zeroing the correlation coefficient $e_x$ and thus the $\beta$ component $_{2\beta}$ of the secondary flux in accordance with the correlation coefficient $e_x$ and the reference signal $i_{1n}$. The calculated secondary time constant compensating coefficient $R_2^*$; that is, the reciprocal of the secondary time constant $\tau_2^*$ is represented as:

$$R_2^* = R_2^* + Xb \times \text{sign}(i_{1n})$$

Where sign $(i_{1n})$ means that Xb is multiplied by a positive sign when the reference signal $i_{1n}$ is positive and is multiplied by a negative sign when the reference signal $i_{1n}$ is negative.

The secondary time constant compensating coefficient $R_2^*$ is loaded in the multiplier 38 and used in calculating the slip frequency. Therefore, it is possible to compensate the $\beta$ component of the secondary flux used in calculating the slip frequency, resulting in an optimum induction motor vector control. As can be seen from a study of FIGS. 2A and 2B that the $\beta$ component $_{2\beta}$ of the secondary flux comes closer to zero as the secondary time constant $\tau_2^*$ used for slip frequency calculations comes closer to the actual secondary time constant $\tau_2$.

Figure 3:
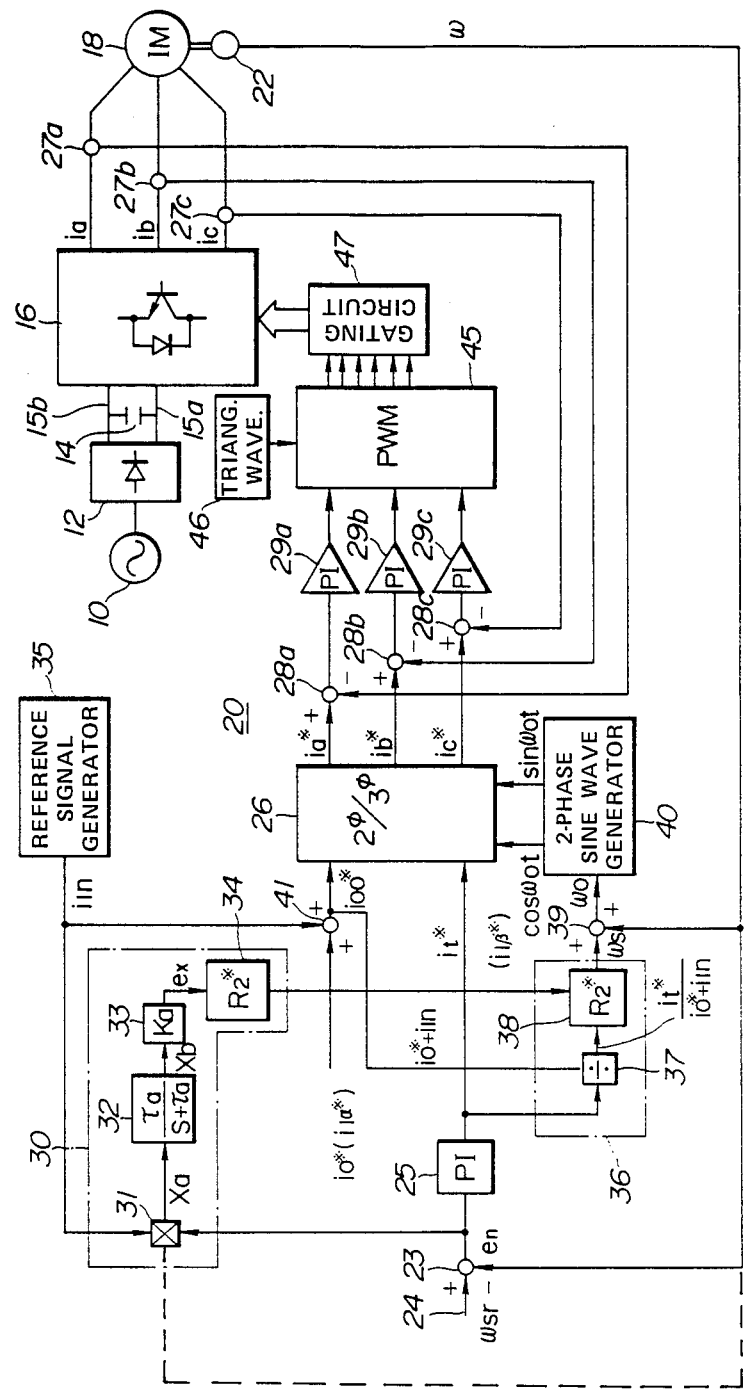
FIG. 3 is a schematic block diagram showing a second embodiment of the invention.

Referring to FIG. 3, there is illustrated another embodiment which differs from the first embodiment only in that the divider 37 receives a signal $i_{oo}^* (=i_{1n}+i_o^*)$ from the summing circuit 41 instead of the excitation current command signal $i_o^*$. This embodiment is effective to compensate the secondary time constant used in calculating a slip frequency with higher accuracy for induction motors having a low secondary time constant.

It is, therefore, apparent that there has been provided, in accordance with this invention, a simple vector control apparatus which can realize ideal induction motor vector control insensitive to ambient temperature changes and induction motor load changes that fully satisfies the objects, aims and advantages set forth above.

Although the invention has been illustrated and described in connection with an analog arrangement, it is to be noted that the vector control apparatus may employ a digital computer to provide the same effect. Appropriate digital devices for the functions of the respective elements of the vector control apparatus would be obvious to one skilled in the art using the description of this specification as the basis for the computer program.

While this invention has been described in conjunction with specific embodiments thereof, it is evident that many alternatives, modifications and variations will be apparent to those skilled in the art. Accordingly, it is intended to embrace all alternatives, modifications and variations tht fall within the scope of the appended claims.

What is claimed is:

1. An apparatus for vector control of an adjustable-speed induction motor, including a motor drive circuit for applying power to drive the motor, and a control circuit responsive to a torque command signal, an excitation current command signal and a slip frequency for controlling the operation of the motor drive circuit so as to vary the power to the motor, the control circuit including:

a speed sensor sensitive to motor rotation speed for producing a speed feedback signal indicative of a sensed speed of rotation of the motor;

a source for producing a speed command signal indicative of a desired motor speed;

a source for producing an excitation current command signal indicative of a desired motor excitation current;

a source for producing a reference signal;

means for summing the speed feedback signal and the speed command signal to provide a speed error signal indicative of the difference between the sensed and desired motor speeds;

means for converting the speed error signal into the torque command signal;

means for adding the reference signal to the excitation current command signal applied to the control circuit;

means responsive to the excitation current command signal and the torque command signal for calculating the slip frequency using a secondary time constant;

means for calculating a correlation coefficient indicative of a mutual relation between the speed error signal and the reference signal; and means for modifying the secondary time constant, in accordance with the correlation coefficient, in a direction zeroing the correlation coefficient.

2. The apparatus as claimed in claim 1, wherein the correlation coefficient calculating means includes a multiplier for multiplying the speed error signal by the reference signal to produce a multiplied signal indicative of the resulting product, and a primary delay circuit connected to the multiplier for producing a signal indicative of the correlation coefficient.

3. The apparatus as claimed in claim 2, wherein the secondary time constant modifying means includes means for integrating the correlation coefficient indication signal to provide a signal indicative of the reciprocal of the secondary time constant, the secondary time constant indication signal having a sign determined by the reference signal.

4. The apparatus as claimed in claim 3, wherein the slip frequency calculating means includes means for dividing the torque command signal by the excitation current command signal to produce a divided signal indicative of the resulting quotient, means for loading the secondary time constant indication signal fed thereto from the secondary time constant modifying means, and means for multiplying the divided signal by the loaded secondary time constant indication signal to produce a signal indicative of the slip frequency.

5. The apparatus as claimed in claim 3, wherein the slip frequency calculating means includes means for dividing the torque command signal by the sum of the excitation current command signal and the reference signal to produce a divided signal indicative of the resulting quotient, means for loading the secondary time constant indication signal fed thereto from the secondary time constant modifying means, and means for multiplying the divided signal by the loaded secondary time constant indication signal to produce a signal indicative of the slip frequency.

6. An apparatus for vector control of an adjustable-speed induction motor, including a motor drive circuit for applying power to drive the motor, and a control circuit responsive to a torque command signal, an excitation current command signal and a slip frequency for controlling the operation of the motor drive circuit so as to vary the power to the motor, the control circuit including:

a speed sensor sensitive to motor rotation speed for producing a speed feedback signal indicative of a sensed speed of rotation of the motor;

a source for producing a speed command signal indicative of a desired motor speed;

a source for producing an excitation current command signal indicative of a desired motor excitation current;

a source for producing a reference signal;

means for summing the speed feedback signal and the speed command signal to provide a speed error signal indicative of the difference between the sensed and desired motor speeds;

means for converting the speed error signal into the torque command signal;

means for adding the reference signal to the excitation current command signal applied to the control circuit;

means responsive to the excitation current command signal and the torque command signal for calculating the slip frequency using a secondary time constant;

means for calculating a correlation coefficient indicative of a mutual relation between the reference signal and a signal related to the sensed speed of rotation of the motor; and means for modifying the second time constant, in accordance with the correlation coefficient, in a direction zeroing the correlation coefficient.

7. The apparatus as claimed in claim 6, wherein the correlation coefficient calculating means calculates a correlation coefficient of a mutual relation between the reference signal and the speed feedback signal.

8. The apparatus as claimed in claim 7, wherein the correlation coefficient calculating means includes a multiplier for multiplying the speed feedback signal by the reference signal to produce a multiplied signal indicative of the resulting product, and a primary delay circuit connected to the multiplier for producing a signal indicative of the correlation coefficient.

9. The apparatus as claimed in claim 8, wherein the secondary time constant modifying means includes means for integrating the correlation coefficient indication signal to provide a signal indicative of the reciprocal of the secondary time constant, the secondary time constant indication signal having a sign determined by the reference signal.

10. The apparatus as claimed in claim 9, wherein the slip frequency calculating means includes means for dividing the torque command signal by the excitation current command signal to produce a divided signal indicative of the resulting quotient, means for loading the secondary time constant indication signal fed thereto from the secondary time constant modifying means, and means for multiplying the divided signal by the loaded secondary time constant indication signal to produce a signal indicative of the slip frequency.

11. The apparatus as claimed in claim 9, wherein the slip frequency calculating means includes means for dividing the torque command signal by the sum of the excitation current command signal and the reference signal to produce a divided signal indicative of the resulting quotient, means for loading the secondary time constant indication signal fed thereto from the secondary time constant modifying means, and means for multiplying the divided signal by the loaded secondary time constant indication signal to produce a signal indicative of the slip frequency.

* * * * *